(12) United States Patent
Kavanagh et al.

(10) Patent No.: US 6,360,334 B1
(45) Date of Patent: Mar. 19, 2002

(54) METHOD AND APPARATUS FOR VERIFYING A SOFTWARE CONFIGURATION OF A DISTRIBUTED SYSTEM

(75) Inventors: Russell Kavanagh, Huntington Beach; Donna Love; David Jenkins, both of Trabuco Canyon, all of CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/203,219

(22) Filed: Nov. 30, 1998

(51) Int. Cl.⁷ ................................................. H02H 3/05
(52) U.S. Cl. .................. 714/38; 713/200; 709/222; 707/6
(58) Field of Search ............................... 714/38, 37, 25, 714/1; 707/3, 6; 713/200; 709/222; 700/83; 379/220

(56) References Cited

U.S. PATENT DOCUMENTS

| | | | | |
|---|---|---|---|---|
| 5,923,673 A | * | 7/1999 | Henrikson | 714/712 |
| 6,092,213 A | * | 7/2000 | Lennie et al. | 714/3 |
| 6,131,119 A | * | 10/2000 | Fukui | 709/224 |
| 6,163,823 A | * | 12/2000 | Henrikson | 710/100 |
| 6,173,417 B1 | * | 1/2001 | Merrill | 714/15 |

* cited by examiner

Primary Examiner—Robert Beausoleil
Assistant Examiner—Rita A Ziemer
(74) Attorney, Agent, or Firm—Nathan O. Jensen; Kyle Eppele (57) ABSTRACT

A software record that identifies a software component associated with a processor in a distributed processing system is retrieved from a software configuration database. A check value is calculated for a copy of the software component loaded on the processor. The check value is compared to a second check value retrieved from the software record to verify the software component file.

27 Claims, 10 Drawing Sheets

FIG. 1B

| LRU | ID | H/W Part No. | Log Adr | Location | IsSvr | IsEmb | IsNld |
|---|---|---|---|---|---|---|---|
| SMU | 1 | 970-0029-001 | 1 | VCC | 1 | 0 | 0 |
| ACP | 1 | N/A | 1 | VCC | 1 | 0 | 0 |
| 485 | SMU1 | 725-0172-001 | 1 | VCC | 1 | 0 | 0 |
| SIU | 1 | 970-0002-001 | 1 | VCC | 1 | 0 | 0 |
| 485 | SIU1 | 725-0172-001 | 1 | VCC | 1 | 0 | 0 |
| ARU | 1 | 980-9900-001 | 1 | VCC | 0 | 0 | 1 |
| VRU | 1 | 743-0293-001 | 1 | VCC | 0 | 0 | 1 |
| VRU | 2 | 743-0293-001 | 2 | VCC | 0 | 0 | 1 |
| SVDU | 1 | 700-2220-002 | 8-1-1 | Sta. 125 | 0 | 0 | 1 |
| :(up to 32 SVDU entries) | | | | | | | |
| SVDU | 10A | 700-2220-002 | 8-1-5 | Sta. 545 | 0 | 0 | 1 |
| : | | | | | | | |
| ASU | 1 | 970-0001-001 | 1 | VCC | 1 | 0 | 0 |
| DSU | 1 | 970-0011-001 | 1 | Overhead Comp. | 1 | 0 | 0 |
| DSU | 2 | 970-0011-001 | 2 | Overhead Comp. | 1 | 0 | 0 |
| MSU | 1 | 970-0010-001 | 1 | Overhead Comp. | 1 | 0 | 0 |
| :(up to 16 MSU entries) | | | | | | | |
| MSU | 16 | 970-0010-001 | 16 | Overhead Comp. | 1 | 0 | 0 |
| : | | | | | | | |
| ZBU | 1 | 970-0003-001 | 1 | ZIA 1 | 0 | 1 | 0 |
| :(up to 48 ZBU entries) | | | | | | | |
| ZBU | 16 | 970-0003-001 | 16 | ZIA 5 | 0 | 1 | 0 |
| : | | | | | | | |
| SEU | 1A | 970-0013-001 | 1-1-1 | Below seat 1A | 0 | 1 | 0 |
| :(up to appx. 150 entries for SEUs) | | | | | | | |
| SEU | 64J | 970-0013-001 | 9-3-5 | Below seat 64J | 0 | 1 | 0 |
| : | | | | | | | |
| PCU | 1A | 970-0005-001 | 1-4-4-1 | Seat 1A | 0 | 1 | 0 |
| PCU | 1C | 970-0005-001 | 1-4-4-2 | Seat 1C | 0 | 1 | 0 |
| :(up to 500 entries for PCUs) | | | | | | | |
| PCU | 64H | 970-0005-001 | 9-3-5-1 | Seat 64H | 0 | 1 | 0 |
| PCU | 64J | 970-0005-001 | 9-3-5-2 | Seat 64J | 0 | 1 | 0 |
| PCU | 64K | 970-0005-001 | 9-3-5-3 | Seat 64K | 0 | 1 | 0 |
| : | | | | | | | |
| PCH | 1A | 970-0022-001 | 1-4-4-1 | Seat 1A | 0 | 1 | 0 |
| :(up to 500 entries for PCHs) | | | | | | | |
| PCH | 64K | 970-0022-001 | 9-3-5-3 | Seat 64K | 0 | 1 | 0 |
| : | | | | | | | |
| SVD | 1A | 970-0004-001 | 1-4-4-1 | Seat 1A | 0 | 1 | 0 |
| :(up to 500 entries for SVDs) | | | | | | | |
| SVD | 64K | 970-0004-001 | 9-3-5-3 | Seat 64K | 0 | 1 | 0 |
| : | | | | | | | |
| END OF FILE | | | | | | | |

*Fig. 2*

| LRU | S/W Name | S/W Part No. | File Name | Check Value |
|---|---|---|---|---|
| ACP | N/A | N/A | N/A | 0 |
| SVDU | N/A | 050-2471-004 | N/A | 0 |
| VRU | N/A | 27C512-90BV153 | N/A | 0 |
| ARU | N/A | 841P24Q-SYV1.20 | N/A | 0 |
| ASU | ASU App. | 978-0001-430A2E | ASU Appl. | 55738 |
| SIU | 485 Op Code | 978-0002-430A2E | 485Flash.HEX | 14913 |
| SMU | 485 Op Code | 978-0002-430A2E | 485Flash.HEX | 14913 |
| ZBU | ZBM Op Code | 978-0003-430C2E | ZBM Op. Code | 71455 |
| ZBU | TIC Op Code | 978-0003-430C2E | ZBU Op. Code | 14558 |
| SVD | SVD Op Code | 978-0004-430C2E | SvdFlash.HEX | 34377 |
| PCU | PCU Op Code | 978-0005-430C2E | PcuFlash.HEX | 19475 |
| ZBU | ZIM Op Code | 978-0007-410C2E | ZimFlash.HEX | 49241 |
| DSU | DSU App. | 978-0011-430A2E | DSU Appl. | 00837 |
| SMU | SMU App. | 978-0012-430C2E | SmuApp.EXE | 03461 |
| SEU | SEU Op Code | 978-0013-430B2E | SeuFlash.HEX | 25804 |
| PCH | PCH Op Code | 978-0014-430D2E | PchFlash.HEX | 34737 |
| SIU | AV Driver | 978-0053-430A1E | AvDriver.sys | 00090 |
| SIU | Keyline Drvr | 978-0054-430A1E | KeyLine.sys | 52602 |
| SMU | IFES Sevice | 978-0119-430A1E | IFES.EXE | 33031 |
| SMU | Maint. GUI | 978-0120-430A1E | SubMaint.EXE | 45178 |
| SMU | Software Cfg | 978-0200-520A1E | SwCfg.MDB | 00399 |
| SIU | Software Cfg | 978-0200-520A1E | SwCfg.MDB | 00399 |
| SMU | Aircraft Cfg | 978-0201-520A1E | Config.MDB | 06184 |
| SIU | Aircraft Cfg | 978-0201-520A1E | Config.MDB | 06184 |
| ZIM | Aircraft Cfg | 978-0201-520A1E | Config.MDB | 06184 |
| SMU | BITE App. | 978-0300-460A1E | BiteApp.EXE | 16791 |
| SMU | ODS App. | 978-0302-460A1E | OdsApp.EXE | 06633 |
| SMU | Dload App. | 978-0303-460B1E | DloadApp.EXE | 39747 |
| SMU | SMU GUI | 978-0313-460B1E | SmuGui.EXE | 30691 |
| SIU | SIU App. | 978-0314-460B1E | SiuApp.EXE | 07861 |
| MSU | MSU App. | 978-0315-460B1E | MSUApp.EXE | 73347 |
| SEU | K6 Op Code | 978-0316-460B1E | Pass. UI | 33755 |
| SMU | SYS BITE. | 978-0317-460B1E | I_BITE.dll | 60065 |
| SIU | SYS BITE. | 978-0318-460B1E | I_BITE.dll | 60065 |
| SIU | SIU Init | 978-0319-460B1E | SiuInit.EXE | 07861 |
| : | | | | |
| END OF FILE | | | | |

```
Configuration Report for P@ssport P/N xxx-xxxx-xxxxxx Version Passport Version x.xx Aircraft ID: SY-98
Date: dd/mm/yy   Time: hh:mm
Database P/N: 977-5000-001B2E WARNING: SMU Software Configuration Database has changed since the last
         software installation.
Actual P/N: 978-6000-001A1E    Expected P/N: 978-6000-001B2E WARNING: SMU Aircraft Configuration Database has changed since the last
         database installation.
Actual P/N: 977-5000-001A1E    Expected P/N: 977-5000-001B1E Cfg   LRU ID   S/W Name      S/W Part No.    D/B Part No.     H/W Part No.   S/N
FAIL  SIU 1    SIU CBTE Svr  978-0124-430A1E 977-5000-001A1E  123-0000-123

End of report
```

*Fig. 5*

```
Configuration Report for P@ssport P/N xxx-xxxx-xxxxxx

Aircraft ID: SY-98
Date: dd/mm/yy   Time: hh:mm
Database P/N: 977-5000-001B2E

Cfg    LRU   ID    S/W Name      S/W Part No.      D/B Part No.     H/W Part No.   S/N
CK     SMU   1     SMU App.      978-0012-430C2E   977-5000-001B2E  970-0029-001   112345
CK     SMU   1     BITE App.     978-0TBD-xxxxxx   977-5000-001B2E  970-0029-001   112345
CK     SMU   1     ODS App.      978-0TBD-xxxxxx   977-5000-001B2E  970-0029-001   112345
CK     SMU   1     Dload App.    978-0TBD-xxxxxx   977-5000-001B2E  970-0029-001   112345
CK     SMU   1     SMU GUI       978-0TBD-xxxxxx   977-5000-001B2E  970-0029-001   112345
INFO   ACP   1     N/A           N/A               N/A              N/A            N/A
FAIL   485   SMU1  485 Op Code   *978-0002-430B2E  N/A              725-0172-001   000002
FAIL   SIU   1     SIU App.      978-0TBD-xxxxxx   *977-5000-001A2E 970-0002-001   000923
CK     485   SIU1  485 Op Code   978-0002-430A2E   N/A              725-0172-001   000034
INFO   ARU   1     N/A           841P24Q-SYV1.20   N/A              980-9900-001
INFO   VRU   1     N/A           27C512-90BV153    N/A              743-0293-001
INFO   VRU   2     N/A           27C512-90BV153    N/A              743-0293-001
INFO   SVDU  1     N/A           050-2471-004      N/A              700-2220-002
:(up to 32 SVDU entries)
INFO   SVDU  10A   N/A           050-2471-004      N/A              700-2220-002
:
CK     ASU   1     ASU App.      978-0001-430A2E   N/A              970-0001-001   000011
CK     DSU   1     DSU App.      978-0011-430A2E   N/A              970-0011-001   000094
CK     DSU   2     DSU App.      978-0011-430A2E   N/A              970-0011-001   000078
CK     MSU   1     MSU App.      978-0TBD-xxxxxx   N/A              970-0010-001   000021
:(up to 16 MSU entries)
CK     MSU   16    MSU App.      978-0TBD-xxxxxx   N/A              970-0010-001   000065
:
CK     ZBU   1     ZIM Op Code   978-0007-410C2E   977-5000-001B2E  970-0003-001   002234
CK     ZBU   1     ZBM Op Code   978-0003-430C2E   977-5000-001B2E  970-0003-001   002234
CK     ZBU   1     TIC Op Code   978-0003-430C2E   977-5000-001B2E  970-0003-001   002234
:(up to 48 entries per ZBU (ZIM/ZBM/TIC))
CK     ZBU   16    ZIM Op Code   978-0007-410C2E   977-5000-001B2E  970-0003-001   000534
FAIL   ZBU   16    ZBM Op Code   *978-0003-430B2E  977-5000-001B2E  970-0003-001   000534
CK     ZBU   16    TIC Op Code   978-0003-430C2E   977-5000-001B2E  970-0003-001   000534
:
CK     SEU   1A    SEU Op Code   978-0013-430B2E   977-5000-001B2E  970-0013-001   000504
CK     SEU   1A    K6 Op Code    978-0TBD-xxxxxx   977-5000-001B2E  970-0013-001   000504
:(up to appx. 150 entries for SEUs)
CK     SEU   64J   SEU Op Code   978-0013-430B2E   977-5000-001B2E  970-0013-001   000578
CK     SEU   64J   K6 Op Code    978-0TBD-xxxxxx   977-5000-001B2E  970-0013-001   000578
:
CK     PCU   1A    PCU Op Code   978-0005-430C2E   N/A              970-0005-001   000123
CK     PCU   1C    PCU Op Code   978-0005-430C2E   N/A              970-0005-001   000543
:(up to 500 entries for PCUs)
CK     PCU   64H   PCU Op Code   978-0005-430C2E   N/A              970-0005-001   000025
CK     PCU   64J   PCU Op Code   978-0005-430C2E   N/A              970-0005-001   000123
CK     PCU   64K   PCU Op Code   978-0005-430C2E   N/A              970-0005-001   000432
:
CK     PCH   1A    PCH Op Code   978-0014-430D2E   N/A              970-0022-001   000421
:(up to 500 entries for PCHs)
CK     PCH   64K   PCH Op Code   978-0014-430D2E   N/A              970-0022-001   006821
:
CK     SVD   1A    SVD Op Code   978-0004-430C2E   N/A              970-0004-001   001011
:(up to 500 entries for SVDs)
CK     SVD   64K   SVD Op Code   978-0004-430C2E   N/A              970-0004-001   00C987

End of report
```

*Fig. 6*

Configuration Summary Report for P@ssport P/N xxx-xxxx-xxxxxx

Aircraft ID: SY-98
Date: dd/mm/yy   Time: hh:mm
Database P/N: 977-5000-001B2E

| Cfg | LRU | S/W Name | S/W Part No. | D/B Part No. | H/W Part No. | Qty |
|---|---|---|---|---|---|---|
| OK | SMU | SMU App. | 978-0012-430C2E | 977-5000-001B2E | 970-0029-001 | 1 |
| OK | SMU | BITE App. | 978-0TBD-xxxxxxx | 977-5000-001B2E | 970-0029-001 | 1 |
| OK | SMU | ODS App. | 978-0TBD-xxxxxxx | 977-5000-001B2E | 970-0029-001 | 1 |
| OK | SMU | Dload App. | 978-0TBD-xxxxxxx | 977-5000-001B2E | 970-0029-001 | 1 |
| OK | SMU | SMU GUI | 978-0TBD-xxxxxxx | 977-5000-001B2E | 970-0029-001 | 1 |
| INFO | ACP | N/A | N/A | N/A | N/A | 1 |
| FAIL | 485 | 485 Op Code | *978-0002-430B2E | N/A | 725-0172-001 | 2 |
| FAIL | SIU | SIU App. | 978-0TBD-xxxxxxx | *977-5000-001A2E | 970-0002-001 | 1 |
| INFO | ARU | N/A | 841P24Q-SYVI.20 | N/A | 980-9900-001 | 1 |
| INFO | VRU | N/A | 27C512-90BV153 | N/A | 743-0293-001 | 2 |
| INFO | SVDU | N/A | 050-2471-004 | N/A | 700-2220-002 | 10 |
| OK | ASU | ASU App. | 978-0001-430A2E | N/A | 970-0001-001 | 1 |
| OK | DSU | DSU App. | 978-0011-430A2E | N/A | 970-0011-001 | 2 |
| OK | MSU | MSU App. | 978-0TBD-xxxxxxx | N/A | 970-0010-001 | 10 |
| OK | ZBU | ZIM Op Code | 978-0007-430C2E | 977-5000-001B2E | 970-0003-001 | 8 |
| FAIL | ZBU | ZIM Op Code | *978-0007-430B2E | 977-5000-001B2E | 970-0003-001 | 1 |
| OK | ZBU | ZSM Op Code | 978-0003-430C2E | 977-5000-001B2E | 970-0003-001 | 9 |
| OK | ZBU | TIC Op Code | 978-0C03-430C2E | 977-5000-001B2E | 970-0003-001 | 9 |
| OK | SFU | SEU Op Code | 978-0013-430B2E | 977-5000-001B2E | 970-0013-001 | 48 |
| OK | SEU | K6 Op Code | 978-0TBD-xxxxxxx | 977-5000-001B2E | 970-0013-001 | 48 |
| OK | SEU | SEU Op Code | 978-0013-430B2E | 977-5000-001B2E | 970-0013-002 | 102 |
| OK | SEU | K6 Op Code | 978-0TBD-xxxxxxx | 977-5000-001B2E | 970-0013-002 | 102 |
| OK | PCU | PCU Op Code | 978-0005-430C2E | N/A | 970-0005-001 | 362 |
| FAIL | PCU | NO RESPONSE | | | | 1 |
| OK | PCH | PCH Op Code | 978-0014-430D2E | N/A | 970-0022-001 | 363 |
| OK | SVD | SVD Op Code | 978-0004-430C2E | N/A | 970-0004-001 | 363 |

End of report

*Fig. 7*

```
Extended Configuration Report for P@ssport P/N xxx-xxxx-xxxxxx

Display of all LRUs

Aircraft ID:   SY-98
Date:  dd/mm/yy    Time:  hh:mm
Database P/N: 977-5000-001B2E LRU ID: SMU 1                      Config: OK
S/W Part No.: 978-0012-430C2E      S/W Version: V01       S/W Name: SMU App.
D/B Part No.: 977-5000-001B2E      D/B Version: SA40
H/W Part No.: 970-0029-001         Ser No: 112345         Mod: 3
Logical Address: 1                 Location Desc: VCC
File name: SmuApp.EXE              Config: OK             Actual XCRC: 03461
Component files:
File name: IFES.EXE                Config: OK             Actual XCRC: 33031
File name: SubMaint.EXE            Config: OK             Actual XCRC: 45178
File name: I_BITE.dll              Config: OK             Actual XCRC: 60065
.
.
LRU ID: SIU 1                      Config: FAIL
S/W Part No.: 978-0TBD-xxxxxx      S/W Version: V02       S/W Name: SMU App.
D/B Part No.: 977-5000-001B2E      D/B Version: SA40
H/W Part No.: 970-0002-001         Ser No: 000465         Mod: 2
Logical Address: 1                 Location Desc: VCC
File name: SiuApp.EXE              Config: OK             Actual XCRC: 07861
Component files:
File name: Keyline.sys             Config: FAIL           Actual XCRC: 61780
File name: Avdriver.sys            Config: OK             Actual XCRC: 00090
File name: I_BITE.dll              Config: OK             Actual XCRC: 60065
.
.
LRU ID: SEU 1A                     Config: OK
S/W Part No.: 978-0013-430B2E      S/W Version: E24       S/W Name: SEU Op Code
D/B Part No.: 977-5000-001B2E      D/B Version: SA40
H/W Part No.: 970-0013-001         Ser No: 000504         Mod: 2
Logical Address: 1-1-1             Location Desc: Below seat 1A
.
.
LRU ID: PCU 1A                     Config: OK
S/W Part No.: 978-0005-430C2E      S/W Version: E24       S/W Name: PCU Op Code
D/B Part No.: N/A                  D/B Version: N/A
H/W Part No.: 970-0005-001         Ser No: 000432         Mod: N
Logical Address: 8-4-4-3           Location Desc: Seat 1A
.
.
.
End of report
```

*Fig. 8*

METHOD AND APPARATUS FOR VERIFYING A SOFTWARE CONFIGURATION OF A DISTRIBUTED SYSTEM

BACKGROUND OF THE INVENTION

1. Field of the Invention

The present invention relates to a method and apparatus for software management in a distributed system. In particular, the invention provides a method and apparatus for verifying the software configuration of a distributed system.

2. Background Information

Distributed computing systems can have a variety of hardware configurations. Each hardware configuration can have a variety of software configurations. Further, each software item in the distributed system can be further comprised of a plurality of software components. Thus, the correct software configuration for the distributed system depends on the hardware that should be present, the software items that should be present for the hardware, and the software components that should be present for the software items.

Software items may be replaced individually or be corrupted. Some software items may be contained in particular pieces of hardware that may be replaced individually. As a result, the software configuration can be altered by software maintenance, hardware maintenance, or corruption of system storage. What is needed is a method for verifying the software configuration of a distributed system based on data defining the expected hardware configuration and data defining the software items.

SUMMARY OF THE INVENTION

A software record that identifies a software component associated with a processor in a distributed processing system is retrieved from a software configuration database. A check value is calculated for a copy of the software component loaded on the processor. The check value is compared to a second check value retrieved from the software record to verify the software component file.

BRIEF DESCRIPTION OF THE DRAWINGS

FIG. 1, which includes FIG. 1A and FIG. 1B, illustrates an exemplary in-flight entertainment system (IFES), which is a distributed processor system, for use with the present invention.

FIG. 3 is an example of a software configuration data base for use with the present invention.

FIG. 6 is an example of a second report produced by an embodiment of the present invention.

FIG. 7 is an example of a third report produced by an embodiment of the present invention.

FIG. 8 is an example of a fourth report produced by an embodiment of the present invention.

DETAILED DESCRIPTION OF THE INVENTION

Figures 1, 1A:
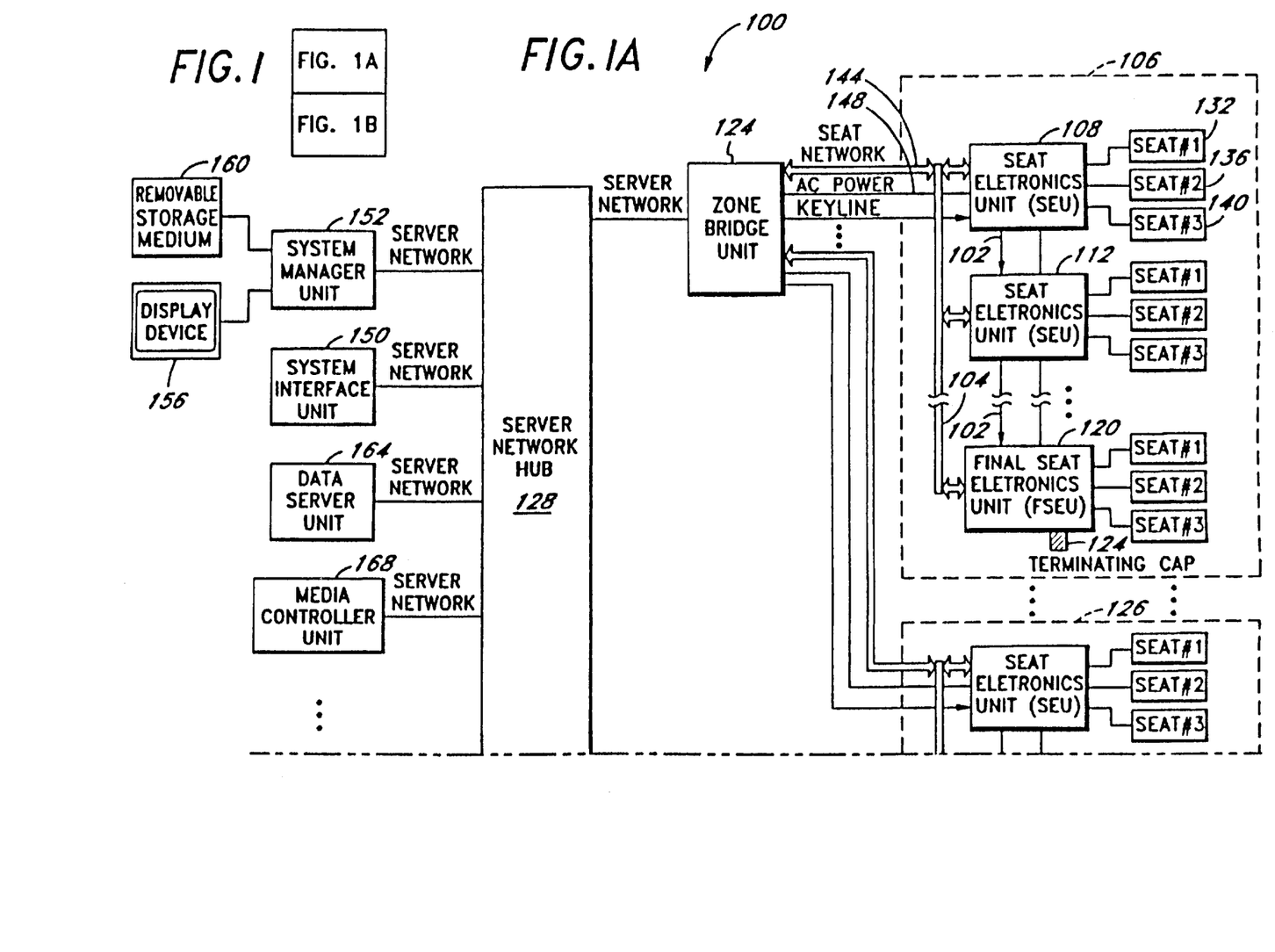
Figure 1B:
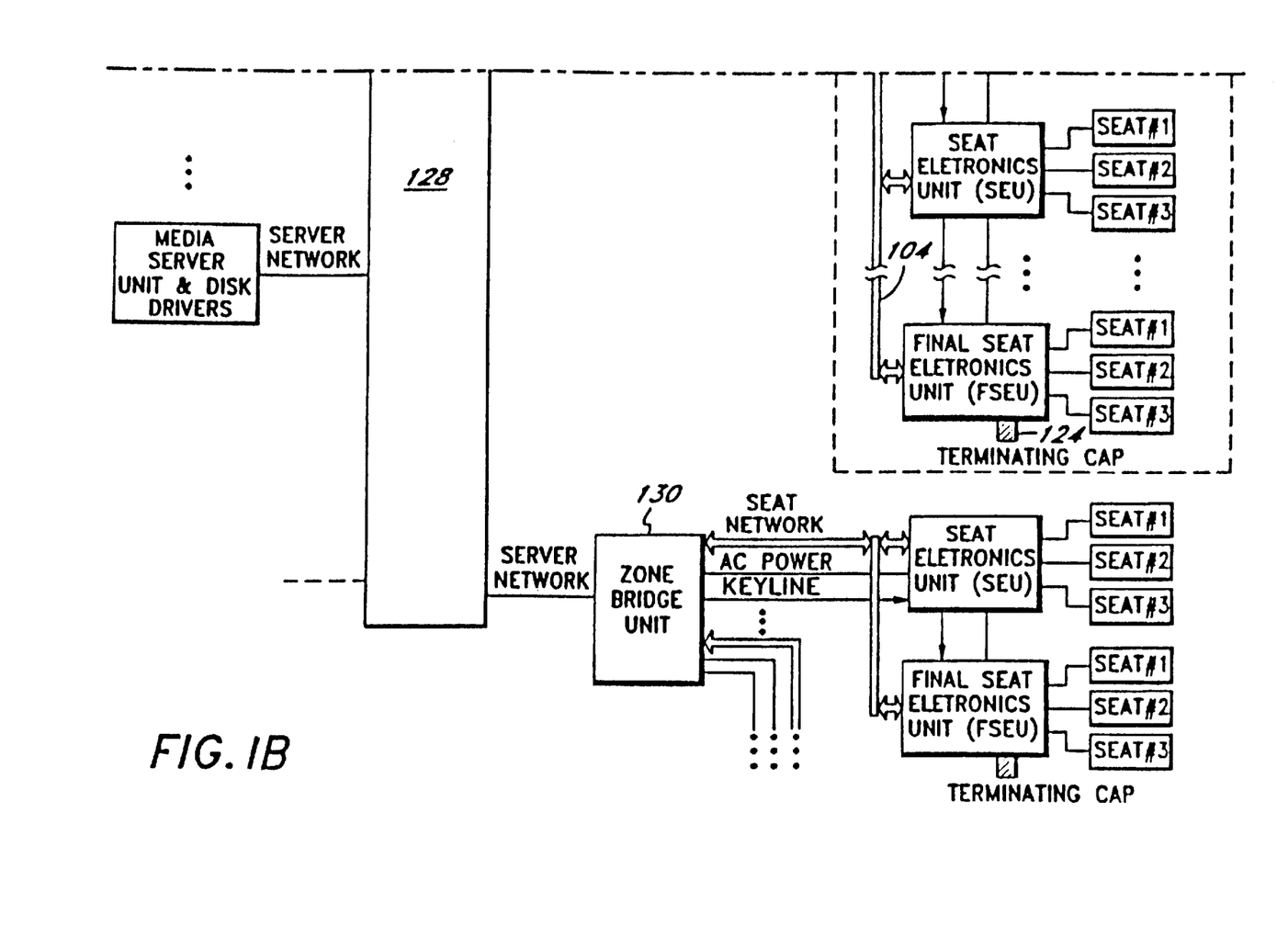

FIG. 1, which includes FIG. 1A and FIG. 1B, illustrates an exemplary in-flight entertainment system (IFES) 100 that typifies a distributed computing system. The IFES 100 is comprised of a plurality of hardware items termed line replaceable units (LRUs) that are controlled by software. LRUs in an IFES 100 include a system manager unit (SMU) 152 that controls devices including a removable storage medium 160 and an attendant control panel (ACP) 156. The IFES 100 further includes LRUs that supply, control, and distribute multi-media data including a system interface unit (SIU) 150, a data server unit (DSU) 164, a media control unit (MCU) 168, and a media server unit (MSU) 170. The foregoing LRUs are connected by a server network hub 128 to create a multi-server network. The IFES 100 further includes seat electronics units (SEUs) 108, 112, 120, that provide in-flight entertainment services to individual seats in an aircraft, and zone bridge units (ZBUs) 124, 130 that connect the SEUs in a hierarchical seat network and connect the seat network to the server network. An IFES 100 may comprise additional LRUs (not shown) connected to the server network or connected to the seat network.

Some LRUs, termed server LRUs, are general purpose computers that store software in a file system and load the software from the file system as required for execution. Other LRUs, termed embedded LRUs, are specialized micro-controllers that store software in field programmable, non-volatile memory devices, such as flash memory or EEPROM. Still other LRUs, termed non-loadable LRUs, are specialized micro-controllers that store software in memory devices, such as ROM, that do not allow software to be loaded after the LRU has been assembled.

In order to certify an aircraft, it must be shown to be in conformity with its configuration specification. That is, each subsystem must be determined to be configured according to the specification stored in the system configuration database. The present invention provides a means of demonstrating the conformity of the software portion of the IFES 100 with its configuration specification.

Figure 2:
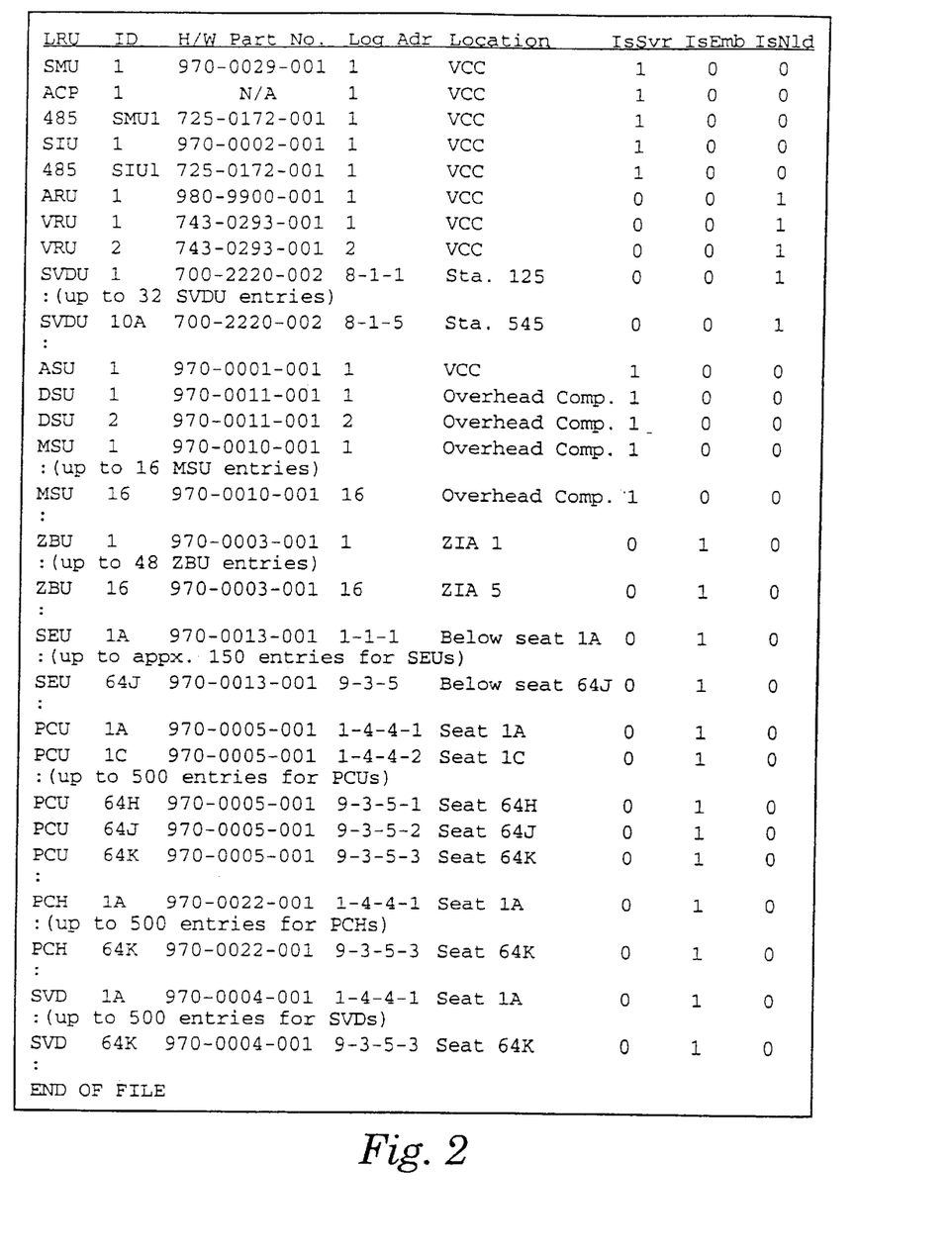
FIG. 2 is an example of a hardware configuration data base for use with the present invention.

The configuration specification of the IFES 100 for a particular aircraft is stored in an aircraft configuration database. An exemplary aircraft configuration database is shown in FIG. 2. The aircraft configuration database comprises data that defines the hardware that should be present on the aircraft, the interconnections of the hardware, the physical locations of the hardware, and the logical addresses of the hardware. Shown in FIG. 2 are fields for LRU, the alphanumeric descriptor of the processor described by the record, ID, an identifying field which is combined with the LRU field to provide a unique identifier for every processor in the system, H/W Part No., a hardware part number, Log Adr, the logical address that provides access to the processor over the system network, Location, a description of the physical location of the processor, IsSvr, a flag that indicates that software for the processor is stored on a file system, IsEmb, a flag that indicates that software for the processor is stored in a loadable memory, and IsNld, a flag that indicates that software for the processor is stored in a non-loadable memory. The aircraft configuration database may contain additional fields not shown in FIG. 2.

The software configuration for the IFES 100 is stored in a software configuration database. An exemplary software configuration database is shown in FIG. 3. Shown in FIG. 3 are fields for LRU, the alphanumeric descriptor of the processor on which the software item described in the record should be loaded, S/W Name, a descriptive name of the software item, S/W Part No., a part number of the software item, File Name, the file name of the file that contains the software item on the master disk and on server processor file systems, and Check Value, a computed value based on the contents of the file for the software item that can be used to verify a copy of the software item. The software configuration database may contain additional fields not shown in FIG. 3.

The software configuration database is generated when the software is built. It is not specific to any particular aircraft. It may contain information about hardware and software items that are not used in a particular aircraft. A record for an LRU that is not present in a hardware configuration is ignored.

The aircraft configuration database and the software configuration database are loaded and stored in the IFES 100 as part of the installation process. A configuration check program that embodies the present invention is also loaded and stored in the IFES 100 as part of the installation process. The configuration check program uses information from the aircraft configuration database and the software configuration database to verify the software configuration of the IFES 100. The configuration check program is used only in a maintenance mode of the IFES 100.

Installation of the aircraft configuration database includes making a copy of the database in a file system that is part of the IFES 100 and placing a copy of the aircraft configuration database part number in a registry maintained by a processor in the IFES 100. Installation of the software configuration database includes making a copy of the database in the file system that is part of the IFES 100 and placing a copy of the software configuration database part number in the registry maintained by the processor in the IFES 100. In another embodiment, one or both databases are copied into the file systems of additional processors that will run the configuration check program for software that is loaded on the file system of that processor and/or hardware that is connected to that processor.

Figure 4A:
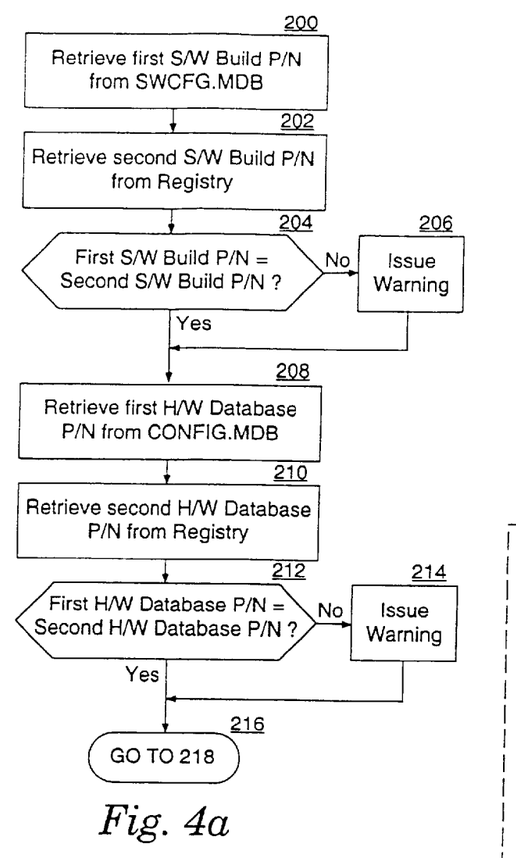
FIG. 4a is a flowchart of one portion of a program that embodies the present invention.

The database part numbers are retrieved from the aircraft configuration database and the software configuration database to confirm that the correct databases were installed. FIG. 4a is a flowchart for the method of confirming the database installation.

A first software build part number is retrieved from the software configuration database 200. A second software build part number is retrieved from the registry 202. The first and second part numbers are compared to confirm that the software configuration database present on the file system matches the one installed 204. If there is a mismatch between a part number retrieved from the database and the registry, a warning message is issued 206. In another embodiment, a software configuration database version number is also retrieved and displayed.

Figure 5:
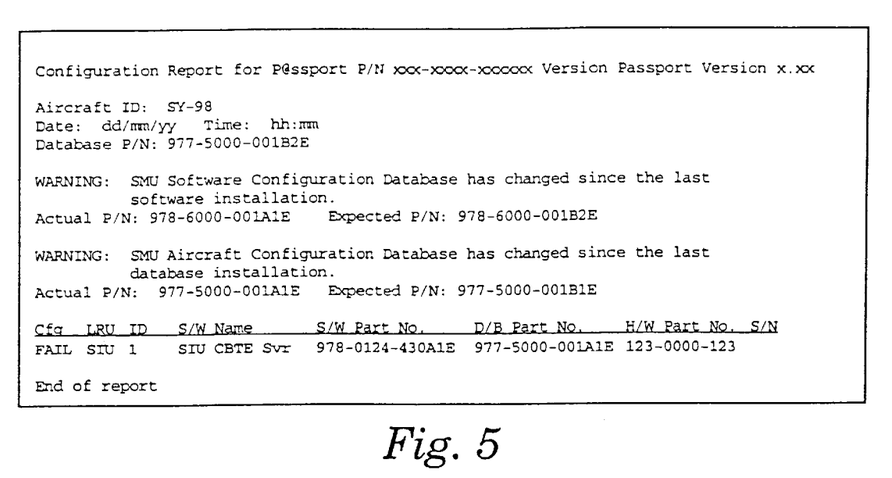
FIG. 5 is an example of a first report produced by an embodiment of the present invention.

A first hardware database part number is retrieved from the hardware configuration database 208. A second hardware database part number is retrieved from the registry 210. The first and second part numbers are compared to confirm that the hardware configuration database present on the file system matches the one installed 212. If there is a mismatch between a part number retrieved from the database and the registry, a warning message is issued 214. In another embodiment, a hardware configuration database version number is also retrieved and displayed. FIG. 5 is an example of a report produced by an embodiment of the present invention that shows a mismatch for both the hardware configuration database and the software configuration database.

Figure 4B:
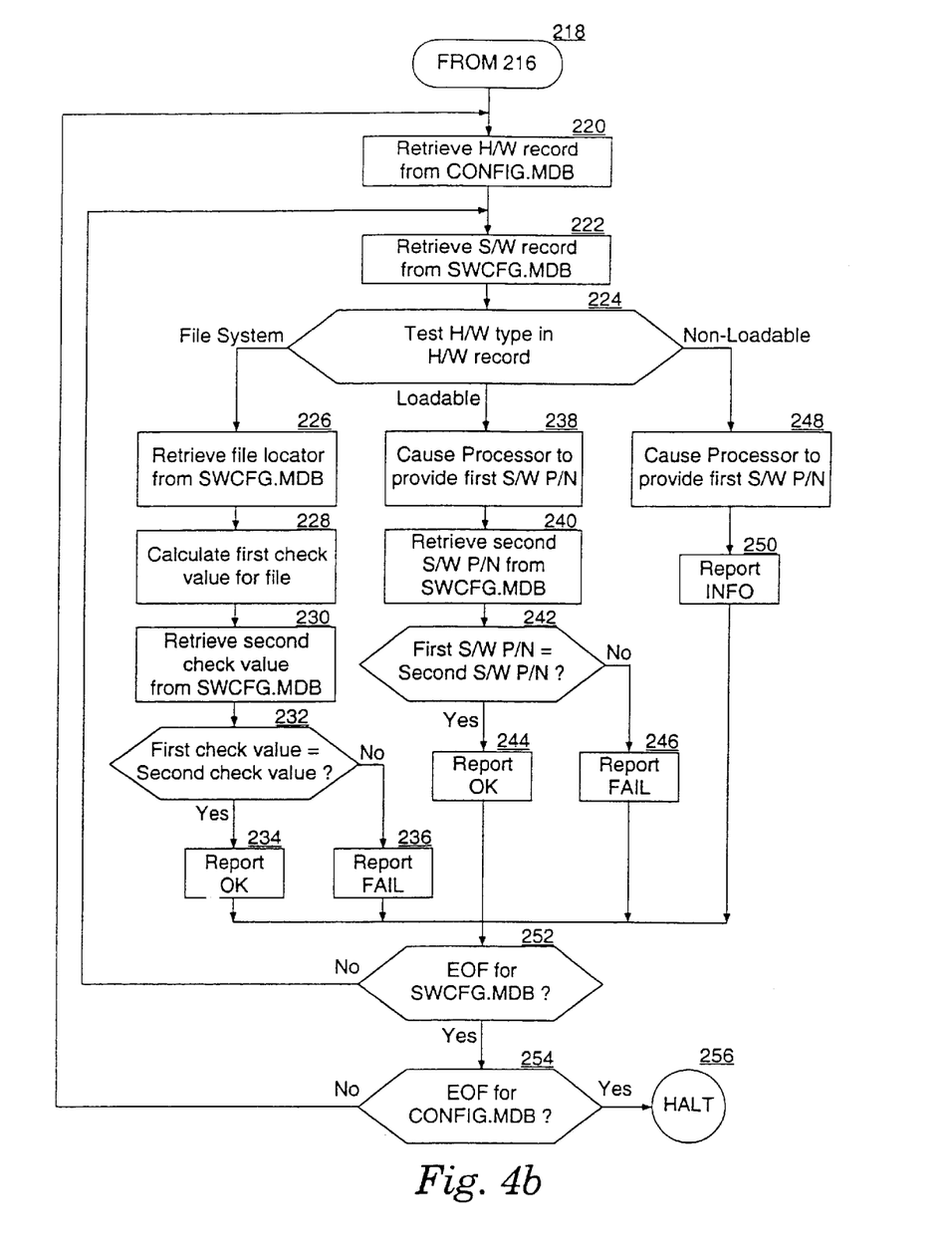
FIG. 4b is a flowchart of a second portion of a program that embodies the present invention.

After the part numbers of the loaded databases are confirmed, the software loaded on the individual processors in the system is verified as shown in FIG. 4b. The aircraft configuration database is read to determine what hardware should be present 220. A record from the aircraft configuration database, as illustrated by FIG. 2, includes information about one hardware item, also termed a line replaceable unit (LRU), in the IFES 100. The information in the record includes the LRU name, system identifying number, hardware part number, logical address, location description, and flags that describe how software is stored by the hardware (file system, loadable non-volatile memory, or non-loadable memory). The record may contain additional items not described. There is one record in the hardware configuration database for every processor present in the distributed processor system. Each hardware record is read 220 and processed 222–252 until an end of file is detected for the hardware configuration database 254 indicating that all records in the hardware configuration database have been processed.

For each hardware record, the software configuration database is searched to locate records with LRU fields that match the LRU field for the current hardware record 222. The search is continued until an end of file is detected for the software configuration database 252 indicating that all records in the software configuration database have been processed in the search for software records that match the hardware record being processed. This is necessary because more than one software item may be loaded on a single LRU.

A record from the software configuration database provides information about one software component that should be loaded on one hardware component if present in the system. The information in the record, as shown in FIG. 3, includes the software name, the software part number, the LRU identification for hardware items on which the software should be loaded, the software file name, and a check value for the file computed at the time the software configuration data base was created. The check value is computed by performing an exclusive OR checksum for the file containing the software item. Other types of check values used to assure the integrity of a stream of data, as are known in the art, may be used as the check value. The record may contain additional items not described.

In one embodiment of the invention, the software configuration database is searched for all instances of software records that indicate that a software item described by the record should be present on the identified LRU. In another embodiment of the invention, the aircraft configuration database and the software configuration database form a relational database that allows the software records associated with a hardware record to be retrieved based on the relating field of the LRU identity.

In another embodiment of the invention, the software configuration database includes information about software items that are comprised of one or more software components. If a software item should be present for the LRU identified by the record from the aircraft configuration database, then the software configuration database is further consulted to determine the software components that should be present for the software item. In one version of this embodiment, the software configuration database is searched for all instances of software records that indicate that a software item described by the record should be present for the identified software item. In another version, the software configuration database has a relational structure that allows the software component records associated with a software item record to be retrieved based on the relating field of the software item identity.

The software loading for each software record located is verified for the processor identified by the current hardware record. The method of verifying the loading of the software item is determined by the manner is which software is loaded on the hardware item. Some LRUs, termed server LRUs, are general purpose computers with disk based file systems. Software for server LRUs is stored in the file system. Other LRUs, termed embedded LRUs, are specialized processors that store their programs in field loadable, non-volatile storage such as EEPROM or flash memory. Still other LRUs, termed non-loadable LRUs, are specialized processors that have programs in non-loadable memory such as ROM or PROM. The software for non-loadable LRUs is loaded as part of the manufacturing process for the LRU and it is not possible to alter the software configuration of an installed non-loadable LRU. The type of software storage on an LRU is indicated in the record for the LRU in the aircraft configuration database. In the exemplary database shown in FIG. 3, the flags shown as IsSvr, IsEmb, and IsNld are tested to determine what type of verification to use 224.

If the LRU is identified by the hardware record as a server LRU, the one or more files containing the software components identified by the software configuration database are checked to verify that they are consistent with a check value stored in the record for that software component in the software configuration database. The software configuration database contains information, such as the filename, that permits the configuration check process to locate the software component on the server processor's file system. This file locator is retrieved from the software configuration database 226.

Figure 4C:
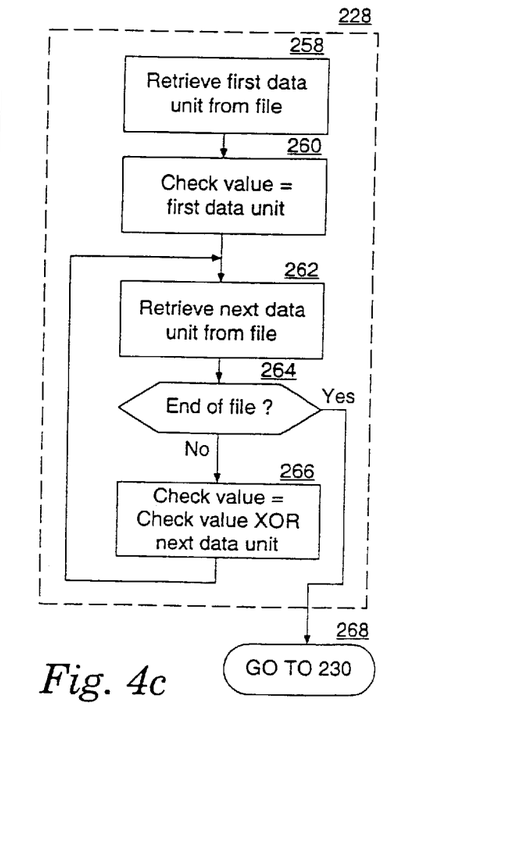
FIG. 4c is a flow chart that shows details of the "calculate first check value" process block 228 of FIG. 4b.

A check value is a value computed based on all the data stored in the file for a software component 228. FIG. 4c is a flowchart that illustrates one method for computing a check value. In this embodiment, the check value is computed by initializing the check value with the value of a first data unit retrieved from the software file as loaded on the processor 258. A next data unit is retrieved from the software file 262. If the end of the software file has not been reached 264, the retrieved data unit is combined with the current value of the check value by an exclusive OR operation 266. This is repeated, beginning with the retrieving of the next value 262, until the end of the software file is reached 264. Processing then continues with retrieval of a second check value as stored in the software record in the software configuration database 230. The second check value is computed at the time the software is built and stored in the record for the software component in the software configuration database. In other embodiments, other forms of check values that give unique values for a file that change if any single bit in the file is changed, are used as the check value. It is important to note that the check value is not stored in the file being checked, or, if it is, that it is not used for computing the check value for the purposes of the present invention.

The first check value is compared to the second check value 232. If the two values are equal, there is a very high confidence that the loaded software component is the same as the software component identified by the software configuration database because the computation of the check value is chosen such that any single bit change in the file produces a different value and all possible check values are produced with a substantially equal probability. The likelihood of two different files having the same check value is approximately one divided by the number of possible check values. If the first check value is the same as the second check value, the configuration is reported as "OK" 234. If the values are not equal, then "FAIL" is reported 236.

If the LRU is identified by the hardware record as an embedded LRU, a first software part number of the software contained in the LRU is retrieved from the LRU 238. A second software part number is retrieved from the record in the software configuration database 240. The first part number is compared to the second part number 242. If the two values are equal, there is confidence that the loaded software component is the same as the software component identified by the software configuration database. If the first part number is the same as the second part number, the configuration is reported as "OK" 244. If the part numbers are not equal, then "FAIL" is reported 246.

In another configuration, a check value is computed by the embedded LRU for the software loaded on the LRU. The check value reported by the LRU is compared to the stored check value in the software configuration database. If the two values are equal, there is a very high confidence that the loaded software component is the same as the software component identified by the software configuration database as discussed above.

If the LRU is identified by the hardware record as a non-loadable LRU, the part number of the software contained in the LRU is retrieved from the LRU 248 and reported with an "INFO" status 250 indicating that the part number is for information only and has not been confirmed. Neither a check value nor a software part number are verified because the software content of non-loadable LRUs is not controlled as part of the software configuration of the IFES 100. In another embodiment, non-loadable LRUs are verified by a part number or check value reported by the LRU as described above for embedded LRUs.

The above described process continues for each matching software record 252 of every hardware record 254. In this way, all software components that should be loaded on every hardware component that should be present are verified. The process halts when the end of the hardware configuration file is reached 256.

In another embodiment, the above process is distributed. A master processor requests slave processors to perform the configuration verification for a subset of the processors in the system and report the results to the master processor. The master processor then prepare a report for the entire system based on the received reports. This embodiment is particularly useful in distributed systems with a hierarchical architecture in which the master processor cannot communicate directly with every processor in the system. Slave processors are chosen so that the software on all processors is checked and the results gathered and forwarded to the master processor for reporting.

FIG. 6 shows an exemplary report produced by an embodiment of the present invention. The part number of the loaded software configuration database 200 is reported on the first line. The part number of the loaded hardware configuration database 208 is reported on the fourth line as "Database P/N." In the lower, tabular section, one line is reported for every software component on every hardware component of the system. The items reported include Cfg, the result of the configuration check 234, 236, 244, 246, 250, LRU, the processor descriptor from the hardware configuration database, ID, the processor identifier from the hardware configuration database, S/W Name, the name of the software component from the software configuration database, S/W Part No., the software part number from the software configuration database, D/B Part No., the part number of the hardware database that was used to generate the report for this hardware component, H/W Part No., the processor part number from the hardware configuration database, and S/N, the processor serial number as reported by the processor.

FIG. 7 shows an exemplary summary report produced by an embodiment of the present invention. This report is identical to the standard report shown in FIG. 6 except that all report lines for identical software components loaded on the same type of processor are reported on a single line with the number of units being reported listed as Qty, which replaces S/N. Note that "OK" components and "FAIL" components that are otherwise identical are reported separately; e.g. the ZIM Op Code on the ZBU.

FIG. 8 shows an exemplary extended report produced by an embodiment of the present invention. This report is identical to the standard report shown in FIG. 6 except that the report for each hardware component is expanded to include multiple lines. Additional information is reported including the actual check value computed for the software component; e.g. Actual XCRC. The extended report may show software items and the software components that make up the software items. Additional information obtained from the hardware configuration database, the software configuration database, or as reported by the processors in the system, may also be reported.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for verifying a software configuration of a distributed processor system comprising:
    retrieving a first copy of a software build part number from the software configuration database;
    retrieving a second copy of the software build part number from a registry, said second copy of the software build part number being placed in the registry during an installation of the software configuration database;
    providing a first signal if the first copy of the software build part number is equal to the second copy of the software build part number;
    providing a second signal if the first copy of the software build part number is not equal to the second copy of the software build part number;
    retrieving a first copy of a hardware configuration database part number from the hardware configuration database;
    retrieving a second copy of the hardware configuration database part number from the registry, said second copy of the hardware configuration database part number being placed in the registry during the installation of the hardware configuration database;
    providing a third signal if the first copy of the hardware configuration database part number is equal to the second copy of the hardware configuration database part number; and
    providing a fourth signal if the first copy of the hardware configuration database part number is not equal to the second copy of the hardware configuration database part number;
    retrieving a hardware record from a hardware configuration database that identifies the processor;
    retrieving a software record from a software configuration database that identifies a software component associated with a processor in the distributed processor system;
    calculating a first check value for a software component file that contains a copy of the software component;
    retrieving a second check value from the software record;
    providing a fifth signal if the first check value is equal to the second check value; and
    providing a sixth signal if the first check value is not equal to the second check value.

2. The method of claim 1, further comprising testing a hardware type indicator in the hardware record and, if the hardware type indicator indicates that the processor is of a first type, then calculating the first check value, retrieving the second check value, and providing one of the fifth and sixth signals.

3. The method of claim 2, further comprising, if the hardware type indicator indicates that the processor is of a second type, causing the processor to provide a first software part number, retrieving a second software part number from the software configuration database, providing a seventh signal if the first software part number is equal to the second software part number, and providing an eighth signal if the first software part number is not equal to the second software part number.

4. The method of claim 3, further comprising, if the hardware type indicator indicates that the processor is of a third type, causing the processor to provide the first software part number, and providing a ninth signal.

5. The method of claim 4, where the processor of the first type is a processor that stores software in a file system, the processor of the second type is a processor that stores software in a loadable non-volatile memory, and the processor of the third type is a processor that stores software in a non-loadable memory.

6. The method of claim 1, further comprising retrieving a file locator for a file containing the software component, from the software record.

7. The method of claim 1, where calculating the first check value further comprises:
    initializing the first check value to be equal to the value of a first data unit from the software component file; and
    calculating a new value for the first check value by forming the exclusive OR of the first check value with a next data unit from the software component file until all data units from the software component file have been used to compute the first check value.

8. A computer software product that includes a medium readable by a processor, the medium having stored thereon a sequence of instructions which, when executed by said processor, causes said processor to verify a software configuration of a distributed processor system by the following means:
    retrieving a hardware record from a hardware configuration database that identifies the processor;
    retrieving a software record from a software configuration database that identifies a software component associated with a processor in the distributed processor system;
    retrieving a file locator for a file containing the software component, from the software record;
    calculating a first check value for a software component file that contains a copy of the software component;

retrieving a second check value from the software record;

providing a first signal if the first check value is equal to the second check value; and providing a second signal if the first check value is not equal to the second check value.

9. The computer software product of claim 8, further comprising:

retrieving a first copy of a software build part number from the software configuration database;

retrieving a second copy of the software build part number from a registry, said second copy of the software build part number being placed in the registry during an installation of the software configuration database;

providing a third signal if the first copy of the software build part number is equal to the second copy of the software build part number;

providing a fourth signal if the first copy of the software build part number is not equal to the second copy of the software build part number;

retrieving a first copy of a hardware configuration database part number from the hardware configuration database;

retrieving a second copy of the hardware configuration database part number from the registry, said second copy of the hardware configuration database part number being placed in the registry during the installation of the hardware configuration database;

providing a fifth signal if the first copy of the hardware configuration database part number is equal to the second copy of the hardware configuration database part number; and providing a sixth signal if the first copy of the hardware configuration database part number is not equal to the second copy of the hardware configuration database part number.

10. The computer software product of claim 8, further comprising testing a hardware type indicator in the hardware record and, if the hardware type indicator indicates that the processor is of a first type, then calculating the first check value, retrieving the second check value, and providing one of the first and second signals.

11. The computer software product of claim 10, further comprising, if the hardware type indicator indicates that the processor is of a second type, causing the processor to provide a first software part number, retrieving a second software part number from the software configuration database, providing a seventh signal if the first software part number is equal to the second software part number, and providing an eighth signal if the first software part number is not equal to the second software part number.

12. The computer software product of claim 11, further comprising, if the hardware type indicator indicates that the processor is of a third type, causing the processor to provide the first software part number, and providing a ninth signal.

13. The computer software product of claim 12, where the processor of the first type is a processor that stores software in a file system, the processor of the second type is a processor that stores software in a loadable non-volatile memory, and the processor of the third type is a processor that stores software in a non-loadable memory.

14. A programmable processor having stored thereon a sequence of instructions which, when executed by said processor, causes said processor to verify a software configuration of a distributed processor system by the following means:

retrieving a hardware record from a hardware configuration database that identifies the processor;

retrieving a software record from a software configuration database that identifies a software component associated with a processor in the distributed processor system; and testing a hardware type indicator in the hardware record and, if the hardware type indicator indicates that the processor is of a first type, then calculating a first check value for a software component file that contains a copy of the software component, retrieving a second check value from the software record, providing a first signal if the first check value is equal to the second check value, and providing a second signal if the first check value is not equal to the second check value.

15. The programmable processor of claim 14, further comprising:

retrieving a first copy of a software build part number from the software configuration database;

retrieving a second copy of the software build part number from a registry, said second copy of the software build part number being placed in the registry during an installation of the software configuration database;

providing a third signal if the first copy of the software build part number is equal to the second copy of the software build part number;

providing a fourth signal if the first copy of the software build part number is not equal to the second copy of the software build part number;

retrieving a first copy of a hardware configuration database part number from the hardware configuration database;

retrieving a second copy of the hardware configuration database part number from the registry, said second copy of the hardware configuration database part number being placed in the registry during the installation of the hardware configuration database;

providing a fifth signal if the first copy of the hardware configuration database part number is equal to the second copy of the hardware configuration database part number; and providing a sixth signal if the first copy of the hardware configuration database part number is not equal to the second copy of the hardware configuration database part number.

16. The programmable processor of claim 14, further comprising, if the hardware type indicator indicates that the processor is of a second type, causing the processor to provide the first software part number, retrieving a second software part number from the software configuration database, providing a seventh signal if the first software part number is equal to the second software part number, and providing an eighth signal if the first software part number is not equal to the second software part number.

17. The programmable processor of claim 16, further comprising, if the hardware type indicator indicates that the processor is of a third type, causing the processor to provide the first software part number, and providing a ninth signal.

18. The programmable processor of claim 17, where the processor of the first type is a processor that stores software in a file system, the processor of the second type is a processor that stores software in a loadable non-volatile memory, and the processor of the third type is a processor that stores software in a non-loadable memory.

19. The programmable processor of claim 14, further comprising retrieving a file locator for a file containing the software component, from the software record.

20. The programmable processor of claim 14, where calculating the first check value further comprises:

initializing the first check value to be equal to the value of a first data unit from the software component file; and calculating a new value for the first check value by forming the exclusive OR of the first check value with a next data unit from the software component file until all data units from the software component file have been used to compute the first check value.

21. A method for verifying a software configuration of a distributed processor system comprising:

retrieving a software record from a software configuration database that identifies a software component associated with a processor in the distributed processor system;

calculating a first check value for a software component file that contains a copy of the software component, where calculating the first check value further comprises initializing the first check value to be equal to the value of a first data unit from the software component file, and calculating a new value for the first check value by forming the exclusive OR of the first check value with a next data unit from the software component file until all data units from the software component file have been used to compute the first check value;

retrieving a second check value from the software record;

providing a first signal if the first check value is equal to the second check value; and providing a second signal if the first check value is not equal to the second check value.

22. The method of claim 21, further comprising retrieving a hardware record from a hardware configuration database that identifies the processor, and then retrieving the software record.

23. The method of claim 21, further comprising retrieving a file locator for a file containing the software component, from the software record.

24. The method of claim 21, further comprising:

retrieving a first copy of a software build part number from the software configuration database;

retrieving a second copy of the software build part number from a registry, said second copy of the software build part number being placed in the registry during an installation of the software configuration database;

providing a third signal if the first copy of the software build part number is equal to the second copy of the software build part number;

providing a fourth signal if the first copy of the software build part number is not equal to the second copy of the software build part number;

retrieving a first copy of a hardware configuration database part number from the hardware configuration database;

retrieving a second copy of the hardware configuration database part number from the registry, said second copy of the hardware configuration database part number being placed in the registry during the installation of the hardware configuration database;

providing a fifth signal if the first copy of the hardware configuration database part number is equal to the second copy of the hardware configuration database part number; and providing a sixth signal if the first copy of the hardware configuration database part number is not equal to the second copy of the hardware configuration database part number.

25. The method of claim 21, further comprising testing a hardware type indicator in the hardware record and, if the hardware type indicator indicates that the processor is of a first type, then calculating the first check value, retrieving the second check value, and providing one of the first and second signals.

26. The method of claim 25, further comprising, if the hardware type indicator indicates that the processor is of a second type, causing the processor to provide a first software part number, retrieving a second software part number from the software configuration database, providing a seventh signal if the first software part number is equal to the second software part number, and providing an eighth signal if the first software part number is not equal to the second software part number.

27. The method of claim 26, further comprising, if the hardware type indicator indicates that the processor is of a third type, causing the processor to provide a the first software part number, and providing a ninth signal.

\* \* \* \* \*